United States Patent
Tzur

(10) Patent No.: US 10,832,417 B1
(45) Date of Patent: Nov. 10, 2020

(54) FUSION OF VISUAL-INERTIAL-ODOMETRY AND OBJECT TRACKER FOR PHYSICALLY ANCHORED AUGMENTED REALITY

(71) Applicant: International Business Machines Corporation, Armonk, NY (US)

(72) Inventor: Yochay Tzur, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/430,482

(22) Filed: Jun. 4, 2019

(51) Int. Cl.
| | |
|---|---|
| H04W 76/14 | (2018.01) |
| G01S 17/89 | (2020.01) |
| G06T 7/20 | (2017.01) |
| G06T 7/70 | (2017.01) |
| G06T 19/00 | (2011.01) |

(52) U.S. Cl.
CPC .............. *G06T 7/20* (2013.01); *G06T 7/70* (2017.01); *G06T 19/006* (2013.01); *G06T 2207/10016* (2013.01); *G06T 2207/20061* (2013.01); *G06T 2207/30244* (2013.01)

(58) Field of Classification Search
CPC .......... G06T 7/20; G06T 7/70; G06T 19/006; G06T 2207/20061; G06T 2207/10016; G06T 2207/30244; G06T 7/73; G05D 1/0094; G05D 1/0278; G05D 1/027; G05D 1/0246; G05D 2201/0213; G01C 11/06; G01C 21/28; G01C 21/26; G06K 9/00798; G08G 1/0133; G08G 1/0137

See application file for complete search history.

(56) References Cited

U.S. PATENT DOCUMENTS

| | | | |
|---|---|---|---|
| 8,761,439 B1* | 6/2014 | Kumar | G06T 7/73 |
| | | | 382/103 |
| 9,709,404 B2* | 7/2017 | Roumeliotis | G01C 21/165 |
| 9,798,929 B2 | 10/2017 | Li et al. | |
| 2017/0336439 A1* | 11/2017 | Li | G01S 5/0294 |
| 2017/0336511 A1* | 11/2017 | Nerurkar | G01S 17/89 |
| 2018/0188032 A1* | 7/2018 | Ramanandan | G01S 19/53 |
| 2018/0188381 A1* | 7/2018 | Zhang | H04W 4/029 |
| 2018/0188382 A1* | 7/2018 | Jose | G01S 19/49 |
| 2018/0188383 A1* | 7/2018 | Niesen | G01S 19/47 |
| 2018/0188384 A1* | 7/2018 | Ramanandan | G01S 19/45 |
| 2019/0033867 A1* | 1/2019 | Sharma | G05D 1/0246 |
| 2019/0043204 A1* | 2/2019 | Mandal | G06K 9/2054 |
| 2020/0137815 A1* | 4/2020 | Wang | G06K 9/2018 |

* cited by examiner

*Primary Examiner* — Howard D Brown, Jr.
(74) *Attorney, Agent, or Firm* — Gregory J. Kirsch

(57) ABSTRACT

Embodiments may provide a fusion of Visual-Inertial-Odometry with Object Tracking for physically anchored Augmented Reality content presentation. For example, a method of generating augmented reality content may comprise receiving a video stream, comprising a plurality of frames, the video stream generated using a camera that is moving about a scene, determining a VIO camera pose for each frame in the video stream in a VIO coordinate system using visual inertial odometry, determining a OT camera pose for at least some of the frames of the video stream in a OT coordinate system using object tracking, determining a relation between the VIO coordinate system and the OT coordinate system and generating augmented reality content that is placed in the video stream of the scene at a location based on the determined relation between the VIO coordinate system and the OT coordinate system.

20 Claims, 5 Drawing Sheets

FUSION OF VISUAL-INERTIAL-ODOMETRY AND OBJECT TRACKER FOR PHYSICALLY ANCHORED AUGMENTED REALITY

BACKGROUND

The present invention relates to techniques that provide a fusion of Visual-Inertial-Odometry with Object Tracking for physically anchored Augmented Reality content presentation.

Visual-Inertial-Odometry (VIO) is a method for estimating the 3D trajectory of a mobile platform from readings of its camera and Inertial Measurement Unit (IMU). This method is implemented in several common mobile platforms, such as mobile phones, tablet computers, wearable cameras etc. Typically, VIO computes the trajectory of the platform in six Degrees-Of-Freedom (three for position and three for orientation) in an arbitrary coordinate system defined ad-hoc for the session. Virtual content placed by the user in the scene maintains its position while the user changes his viewpoint. VIO can deliver a high tracking rate (500-1000 Hz) and near zero-delay, however it does not relate to the actual content seen in a video stream, and cannot be used as is to automatically attach virtual content to physical objects in a scene.

Object Tracking (OT), which may track a physical object in a scene, is a method for estimating the 3D trajectory of a camera with respect to known object or model. OT constantly searches for the object in the video, and when detected, it produces the camera pose in a fixed coordinate system (attached to the object). OT may be used in Augmented Reality applications to attach virtual content, associated with specific points in the model, to the physical object in the scene. Typically, OT is significantly slower than VIO, and may have to be restarted every time the object is not seen in the video stream.

Accordingly, a need arises for techniques that provide object tracking with improved speed and robustness as well as a fixed coordinate system for automatic virtual content creation.

SUMMARY

Embodiments may provide a fusion of Visual-Inertial-Odometry with Object Tracking for physically anchored Augmented Reality content presentation. In embodiments, the present systems and methods may provide a fused-tracker, which is based on fusing VIO with OT. Video frames may be processed both by VIO and OT, to get the pose of the camera in two coordinate systems: The ad-hoc arbitrary VIO axes, and the OT fixed axes attached to the model. This data may be used to estimate a transform from the object to VIO, and thus projecting model-associated content to VIO axes.

For example, in an embodiment, a method of presenting augmented reality content may be implemented in a computer comprising a processor, memory accessible by the processor, and computer program instructions stored in the memory and executable by the processor, and the method may comprise receiving a video stream, comprising a plurality of frames, the video stream generated using a camera that is moving about a scene, wherein the scene includes a physical object to which the augmented reality content is to be anchored, determining a VIO camera pose for each frame in the video stream in a VIO coordinate system using visual inertial odometry, determining a OT camera pose for at least some of the frames of the video stream in a OT coordinate system using object tracking, determining a relation between the VIO coordinate system and the OT coordinate system using those frames for which both a VIO camera pose and a OT camera pose have been determined and presenting augmented reality content that is placed in the video stream of the scene at a location based on the determined relation between the VIO coordinate system and the OT coordinate system and anchored to the physical object.

In embodiments, at the least some of the frames of the video stream that are processed using object tracking may comprise frames in which a model representing the physical object in the scene is found. The relation between the VIO coordinate system and the OT coordinate system may be determined by generating an estimated transform from the VIO coordinate system and the OT coordinate system. The transform may be generated by selecting a plurality of scale candidates for each frame for which both a VIO camera pose and a OT camera pose have been determined generating a plurality of transform candidates, using the scale candidates, for each frame for which both a VIO camera pose and a OT camera pose have been determined, determining a probable transform from among the plurality of transform candidates, and generating the transform based on the determined probable transform. The probable transform may be determined using a generalized Hough transform. The method may further comprise weighting votes in the generalized Hough transform corresponding to more recent frames higher than votes corresponding to less recent frames. The method may further comprise determining an orientation of the object by averaging orientations from votes for which a corresponding 4D line was used in the generalized Hough transform to support the transform.

In an embodiment, a system for presenting augmented reality content may comprise a processor, memory accessible by the processor, and computer program instructions stored in the memory and executable by the processor to perform receiving a video stream, comprising a plurality of frames, the video stream generated using a camera that is moving about a scene, wherein the scene includes a physical object to which the augmented reality content is to be anchored, determining a VIO camera pose for each frame in the video stream in a VIO coordinate system using visual inertial odometry, determining a OT camera pose for at least some of the frames of the video stream in a OT coordinate system using object tracking, determining a relation between the VIO coordinate system and the OT coordinate system using those frames for which both a VIO camera pose and a OT camera pose have been determined, presenting augmented reality content that is placed in the video stream of the scene at a location based on the determined relation between the VIO coordinate system and the OT coordinate system and anchored to the physical object.

In an embodiment, a computer program product for presenting augmented reality content may comprise a non-transitory computer readable storage having program instructions embodied therewith, the program instructions executable by a computer, to cause the computer to perform a method comprising receiving a video stream, comprising a plurality of frames, the video stream generated using a camera that is moving about a scene, wherein the scene includes a physical object to which the augmented reality content is to be anchored, determining a VIO camera pose for each frame in the video stream in a VIO coordinate system using visual inertial odometry, determining a OT camera pose for at least some of the frames of the video stream in a OT coordinate system using object tracking, determining a relation between the VIO coordinate system and the OT coordinate system using those frames for which both a VIO camera pose and a OT camera pose have been determined, presenting augmented reality content that is placed in the video stream of the scene at a location based on the determined relation between the VIO coordinate system and the OT coordinate system and anchored to the physical object.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide techniques that provide object tracking techniques that provide improved speed and robustness as well as a fixed coordinate system and automatic virtual content creation. In embodiments, the present systems and methods may provide a fused-tracker, which is based on fusing Visual-Inertial-Odometry (VIO) with Object Tracking (OT). Video frames may be processed both by VIO and OT, to get the pose of the camera in two coordinate systems: The ad-hoc arbitrary VIO axes, and the OT fixed axes attached to the model. This data may be used to estimate a transform from the object to VIO, and thus projecting model-associated content to VIO axes.

Augmented Reality (AR) involves overlaying virtual content on the physical reality depicted in an image or video stream of a scene. In some use-cases, content may be positioned somewhere in space in the scene. This is known as floating AR. In other scenarios, content may be anchored to a physical object in the scene. This is known as anchored AR. In order to show floating AR, the camera motion may be estimated in real time to determine a location in the scene to place the AR content. Once the content is placed "somewhere", it may be rendered based on the camera motion. In floating AR, the coordinate system is arbitrary and changes in each session. The coordinate system in floating AR may be determined using model-less tracking techniques, such as Simultaneous localization and mapping (SLAM) or Visual-Inertial-Odometry (VIO).

In order to place physically-anchored AR, some "knowledge" about the scene is needed. For example, a 3D model of the target object may be used. The 3D model represents the geometry and appearance of the object, while anchor points are defined in the axes of the coordinate system of the 3D model. In operation, the model may be detected and tracked in a video stream of a scene, which content may be projected based on the positions of the anchor points.

Embodiments of the present system and methods may, in essence, generate a fusion of VIO based tracking and OT based tracking and may provide the advantages of VIO, such as speed and accuracy combined with the advantages of OT, such as fixed axes and anchored AR. In order to perform this fusion, the relation between the fixed axes of the OT coordinate system and the arbitrary axes of the VIO coordinate system may be determined. This then allows the placement of the OT anchor points in the VIO coordinate system and AR content may be place accordingly.

Figure 1:
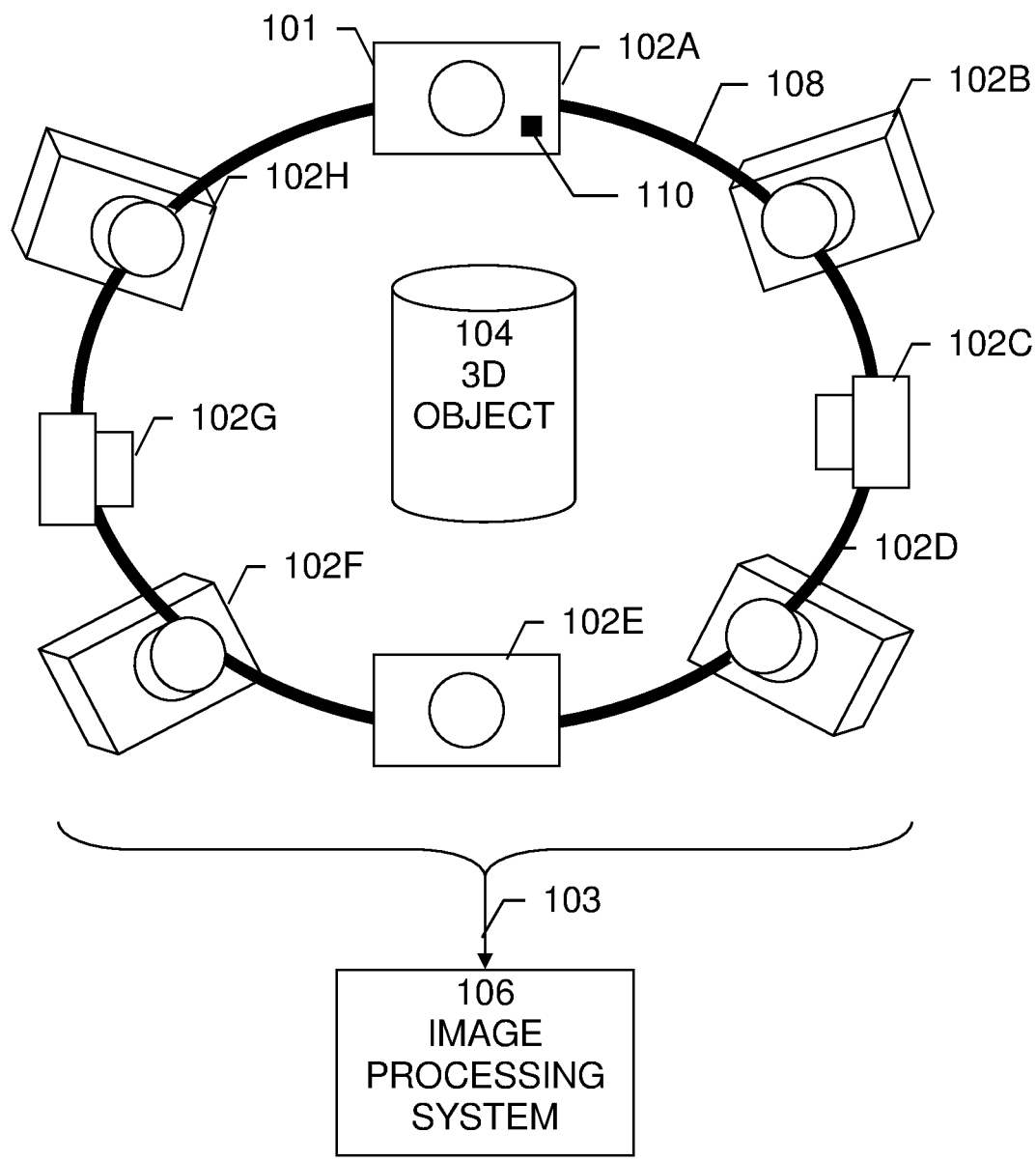
FIG. 1 illustrates an exemplary diagram of a system in which embodiments of the present systems and methods may be implemented.

An exemplary system 100 in which embodiments of the present systems and methods may be implemented is shown in FIG. 1. As shown in the example of FIG. 1, system 100 may include a platform 101 that may be or include a camera to capture video images of a three-dimensional (3D) object 104, which may be a physical object in the scene, from a plurality of viewpoints 102A-H to form a video stream 103. Platform 101 may be moving about following a path or trajectory 108. Video stream 103 may be transmitted to image processing system 106, in which processes involved in embodiments of the present systems and methods may be implemented. For example, image processing system 106 may process the video stream frames using both VIO and OT and to estimate a transform from the OT axes to VIO axes, etc. Further, platform 101 may include an Inertial Measurement Unit (IMU) 110, which may measure and report a force, acceleration, angular rate, etc. of platform 101, typically using a combination of accelerometers and gyroscopes.

Figure 2:
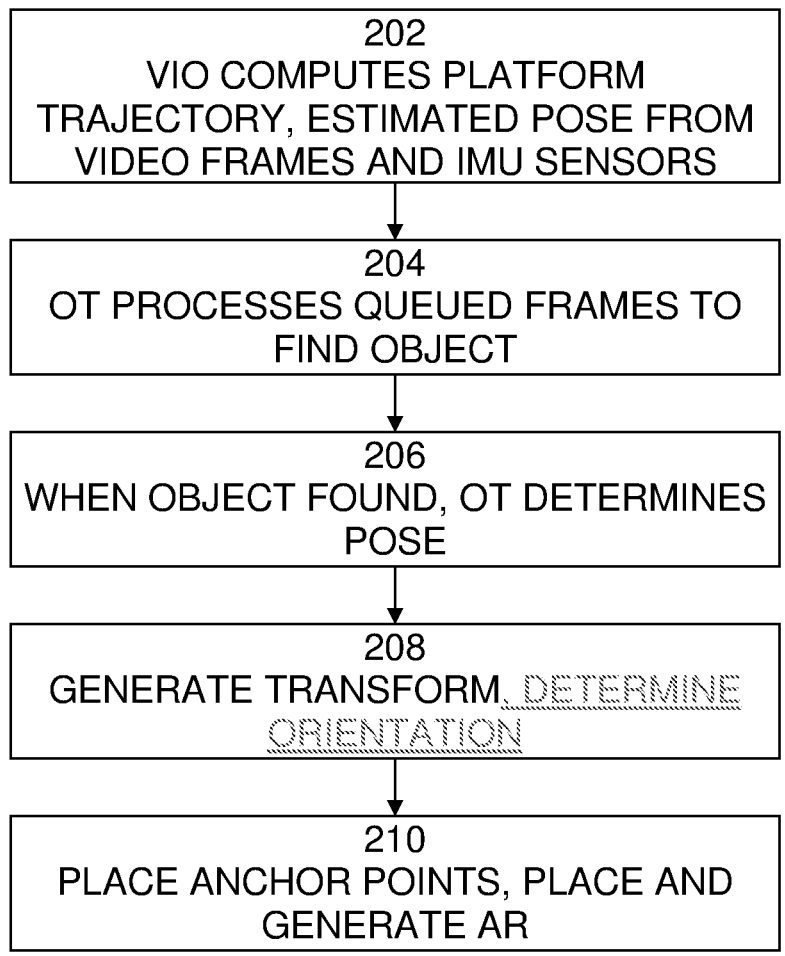
FIG. 2 is an exemplary flow diagram of a process according to embodiments of the present techniques.
Figure 3:
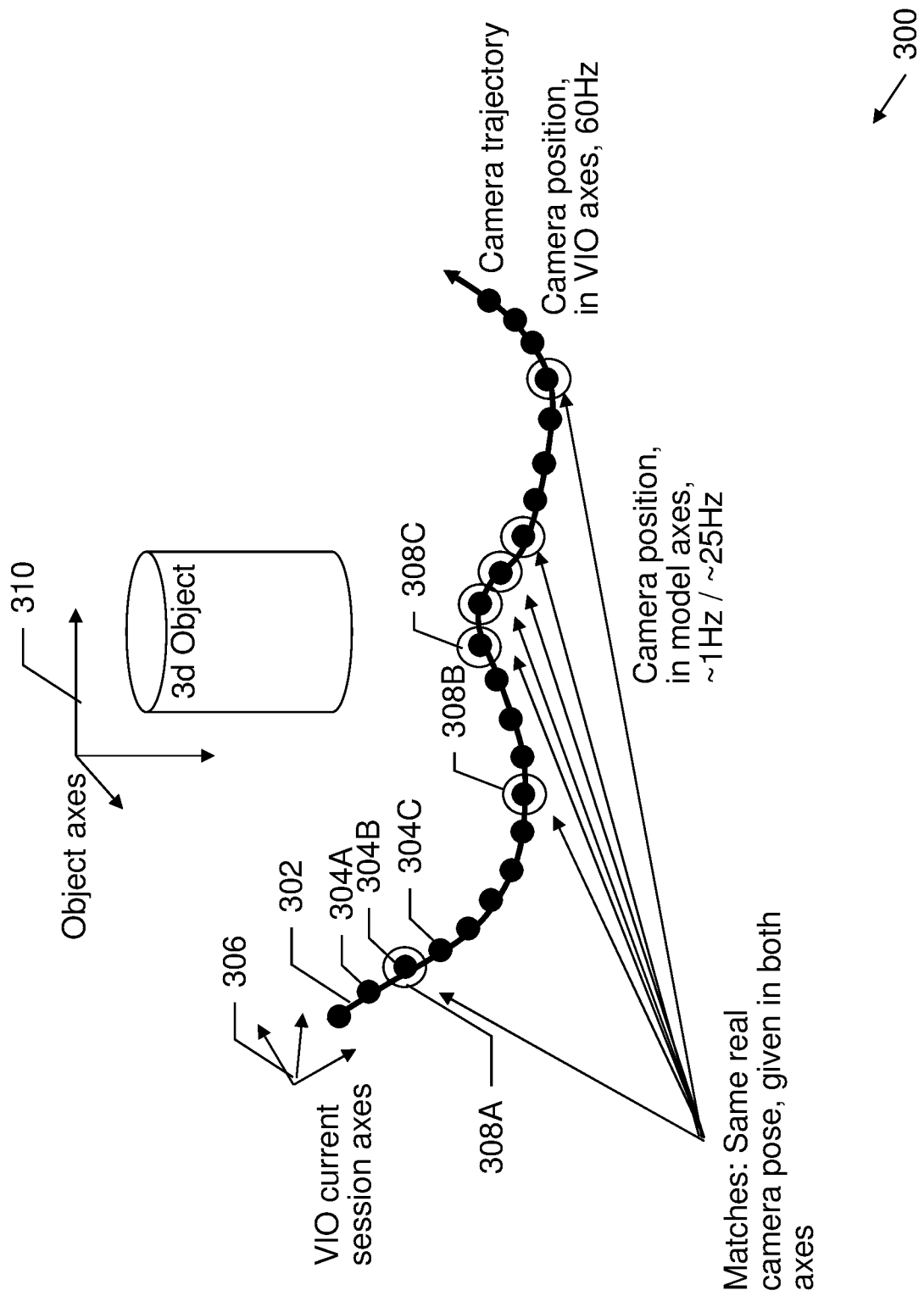
FIG. 3 is an exemplary illustration of performance of the process shown in FIG. 2, in accordance with embodiments of the present systems and methods.

An embodiment of a process 200 of operation according to the present systems and method is shown in FIG. 2. It is best viewed in conjunction with FIG. 3, which illustrates the process. Process 200 begins with 202, in which video stream 103 from platform 101, shown in FIG. 1, may be processed using VIO processing to determine a trajectory 302 of platform 101 and to estimate a pose of the camera from the frames of video stream 103 and the output from IMU 110. As shown in FIG. 3, the solid circles, such as 304A, 304B, 304C, etc. (remainder not marked with reference numerals) represent the location of platform 101 when each frame of video stream 103 is captured. Typically, VIO produces video frames in high frame rate (typical value is 60 Hz) where each frame is associated with estimated camera pose 304A, 304B, 304C, etc., given in an arbitrary coordinate system 306. Typically, coordinate system 306 may be axes used only for the current session of VIO processing. These frames may be pushed into a queue. At 204, the queued frames may be processed using OT processing, which may search each frame to find 3D model 104. Typically, OT processing is performed at a lower frame rate, such as 5-30 Hz (depending on CPU load). As shown in FIG. 3, the frames that are processed using OT processing are indicated by open circles, such as 308A, 308B, 308C, etc. (remainder not marked with reference numerals). At 206, for those frames for which OT finds 3D model 104, the OT processing may then determine the pose of the camera in platform 101 with respect to the object's coordinate system 301.

Figure 4:
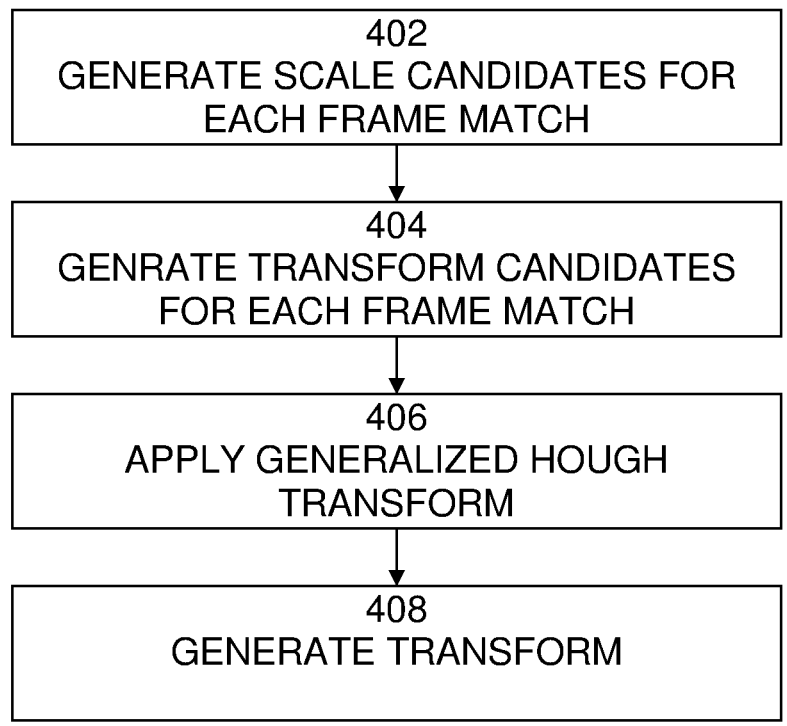
FIG. 4 is an exemplary flow diagram of a process according to embodiments of the present techniques.

For those frames in which an object was found using OT processing, the process has a "frame match", that is a frame for which two estimations for the camera pose were made, one estimation with VIO processing, such as frame 304B, and the same frame with an estimation from OT processing, also designated frame 308A. One estimation for the camera pose may be given in VIO coordinate system 306, and one estimation for the camera pose may be given in OT coordinate system 310. At 208, from the frame match, a transform from one coordinate system to the other may be generated. A flow diagram of process 208 is shown in FIG. 4. The transform involves rotation, translation, and scaling and cannot be determined from a single match. In embodiments, rather than estimating the transform, instead the position, orientation, and scale of the model in VIO coordinate system 306 may be determined, which is equivalent. The position of the model for a given scale s may be determined according to:

$$P_{model-in-VIO}(s)=(x,y,z).$$

However, the scale between the model in VIO coordinate system 306 and the model in OT coordinate system 310 is not known. As a result, the transform involves 7 degrees of freedom—position xyz (along x, y, and z axes), orientation rpy (roll, pitch, yaw), and scale, which is not known, so each frame match may yield an infinite number of transform candidates. Each transform candidate may be represented as a line in the 4D space, with dimensions [x y z scale]. Accordingly, at 402, a finite number of scale candidates, which are possible scale values, may be selected. In embodiments, the scale candidates may be sampled in a logarithmic space, log(s) over the range of s. Then at 404, the corresponding finite number of transform candidates, each of which may be represented as a line in the 3D space, may be generated. This set of transform candidates may be represented as a line in the 4D space. Each new frame match will then provide another line in the 4D space. In order to determine an estimate for the correct value of s, a generalized Hough Transform (GHT) over the 4D parameters space {log(s), x, y, z} may be performed using a plurality of the lines in the 4D space obtained from a plurality of frame matches.

Using the generalized Hough transform, determining the position of an object may be transformed into finding the value of the transformation parameter, here, the scale s, which maps the model into the image. Once the value of the scale s, is determined or estimated, the position of the model in the image may be determined. For example, the 4D metrics of the GHT may be initialized at empty values. Each frame match may essentially draw a 4D line in these metrics. As each new frame match is added, its line may be sampled to get votes for transforms. For example, when a new line is added, the line may receive a vote of "1". Typically, there will be a number of lines added that are the same or similar, so the vote total of that line may be incremented by 1 for each new line that is the same or similar. As new lines are added, the lines may tend to intersect at a point or at least in a discernable area of the 4D metrics. The intersection area may be discerned using clustering based on the votes. The lines, based on the votes from the frame matches, may be clustered, to find the maximum point in the 4D metrics, {log(s), x, y, z}, which may indicate the most probable transform. The maximum point {log(s), x, y, z} defines scale and position of the model in the VIO pose. Thus, the orientation may be determined by averaging the orientations of the frames supported at the maximum points. Accordingly, the fused tracker may generate the transform that corresponds to the most probable transform. The generated transform may define the relation between the fixed axes of the OT coordinate system and the arbitrary axes of the VIO coordinate system.

The OT pose has occasional outliers (incorrect pose in model axes), and the transform generation using GHT may be sufficiently robust to identify and reject outliers. The VIO pose has an accumulated drift over time. Accordingly, even after a transform has been generated, the transform should be constantly updated using new frames. In embodiments, more recent frames may be weighted higher than less recent frames. For example, the votes for each frame in the GHT may start with a maximal weight, such as 1, and the weight for those frames may be decreased over time, so that the votes corresponding to older frames are weighted less over time to compensate for the drift.

Further, at 208, the orientation of the object in the fused coordinate system may be determined by averaging orientations from all votes for which their 4D line was used in the GHT to support the estimated transform.

Returning to FIG. 2, at 210, once the transform is determined and the relation between the fixed axes of the OT coordinate system and the arbitrary axes of the VIO coordinate system has been defined, OT anchor points in the VIO coordinate system may be placed and AR content may be placed and generated accordingly.

Figure 5:
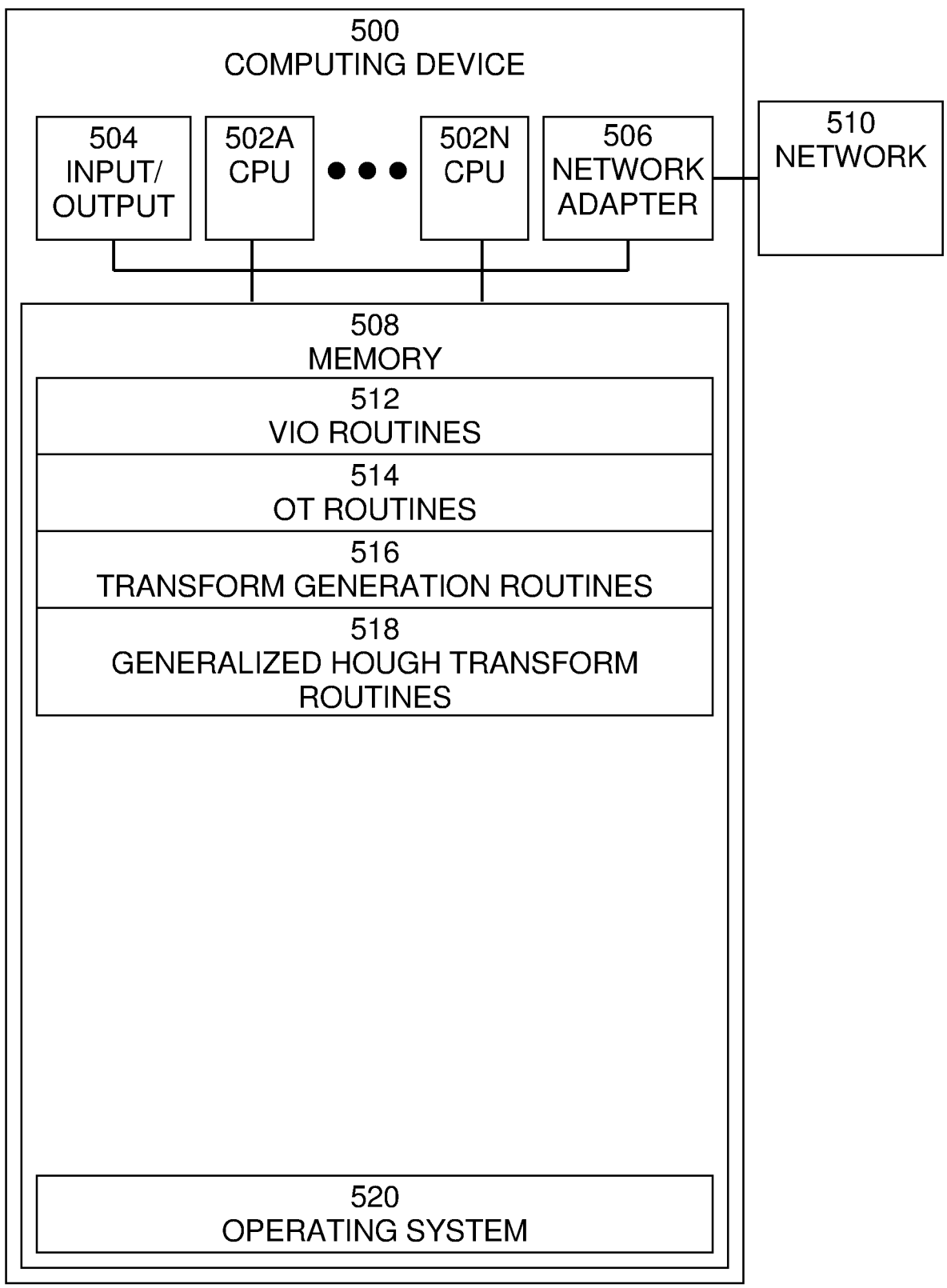
FIG. 5 is an exemplary block diagram of a computer system, in which processes involved in the embodiments described herein may be implemented.

An exemplary block diagram of a computer system 500, in which processes involved in the embodiments described herein may be implemented, is shown in FIG. 5. Computer system 500 may be implemented using one or more programmed general-purpose computer systems, such as embedded processors, systems on a chip, personal computers, workstations, server systems, and minicomputers or mainframe computers, or in distributed, networked computing environments. Computer system 500 may include one or more processors (CPUs) 502A-502N, input/output circuitry 504, network adapter 506, and memory 508. CPUs 502A-502N execute program instructions in order to carry out the functions of the present communications systems and methods. Typically, CPUs 502A-502N are one or more microprocessors, such as an INTEL CORE® processor. FIG. 5 illustrates an embodiment in which computer system 500 is implemented as a single multi-processor computer system, in which multiple processors 502A-502N share system resources, such as memory 508, input/output circuitry 504, and network adapter 506. However, the present communications systems and methods also include embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 506 interfaces device 500 with a network 510. Network 510 may be any public or proprietary LAN or WAN, including, but not limited to the Internet.

Memory 508 stores program instructions that are executed by, and data that are used and processed by, CPU 502 to perform the functions of computer system 500. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 may vary depending upon the function that computer system 500 is programmed to perform. In the example shown in FIG. 5, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 5, memory 508 may include VIO routines 512, OT routines 514, transform generation routines 516, generalized Hough transform routines 518, and operating system 520. VIO routines 512 may include software routines to use VIO processing to determine a trajectory of a platform, as described above. OT routines 514 may include software routines to using OT processing to search frames to find a 3D object and to determine a pose of a platform with respect to a coordinate system of the object, as described above. Transform generation routines 516 may include software routines to generate a transform from an OT pose to a VIO pose using generalized Hough transform routines 518, as described above. Generalized Hough transform training routines 518 may include software routines to determine a transform from an OT pose to a VIO pose that is the most probable transform, as described above. Operating system 520 may provide overall system functionality.

As shown in FIG. 5, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of presenting augmented reality content, implemented in a computer comprising a processor, memory accessible by the processor, and computer program instructions stored in the memory and executable by the processor, the method comprising:
   receiving a video stream, comprising a plurality of frames, the video stream generated using a camera that is moving about a scene, wherein the scene includes a physical object to which the augmented reality content is to be anchored;
   determining a Visual-Inertial-Odometry camera pose for each frame in the video stream in a first coordinate system using visual inertial odometry;
   determining an Object Tracking camera pose for at least some of the frames of the video stream in an Object Tracking coordinate system using object tracking;
   determining a relation between the Visual-Inertial-Odometry coordinate system and the Object Tracking coordinate system using those frames for which both a Visual-Inertial-Odometry camera pose and an Object Tracking camera pose have been determined; and
   presenting augmented reality content that is placed in the video stream of the scene at a location based on the determined relation between the Visual-Inertial-Odometry coordinate system and the Object Tracking coordinate system and anchored to the physical object.

2. The method of claim 1, wherein at the least some of the frames of the video stream that are processed using object tracking comprises frames in which a model representing the physical object in the scene is found.

3. The method of claim 2, wherein the relation between the Visual-Inertial-Odometry coordinate system and the Object Tracking coordinate system is determined by generating an estimated transform from the Visual-Inertial-Odometry coordinate system and the Object Tracking coordinate system.

4. The method of claim 3, wherein the transform is generated by:
   selecting a plurality of scale candidates for each frame for which both a Visual-Inertial-Odometry camera pose and an Object Tracking camera pose have been determined;
   generating a plurality of transform candidates, using the scale candidates, for each frame for which both a Visual-Inertial-Odometry camera pose and an Object Tracking camera pose have been determined;
   determining a probable transform from among the plurality of transform candidates; and
   generating the transform based on the determined probable transform.

5. The method of claim 4, wherein the probable transform is determined using a generalized Hough transform.

6. The method of claim 5, further comprising weighting votes in the generalized Hough transform corresponding to more recent frames higher than votes corresponding to less recent frames.

7. The method of claim 6, further comprising determining an orientation of the object by averaging orientations from votes for which a corresponding 4D line was used in the generalized Hough transform to support the transform.

8. A system for presenting augmented reality content, the system comprising a processor, memory accessible by the processor, and computer program instructions stored in the memory and executable by the processor to perform:
   receiving a video stream, comprising a plurality of frames, the video stream generated using a camera that is moving about a scene, wherein the scene includes a physical object to which the augmented reality content is to be anchored;

determining a Visual-Inertial-Odometry camera pose for each frame in the video stream in a Visual-Inertial-Odometry coordinate system using visual inertial odometry;

determining an Object Tracking camera pose for at least some of the frames of the video stream in an Object Tracking coordinate system using object tracking;

determining a relation between the Visual-Inertial-Odometry coordinate system and the Object Tracking coordinate system using those frames for which both a Visual-Inertial-Odometry camera pose and an Object Tracking camera pose have been determined; and presenting augmented reality content that is placed in the video stream of the scene at a location based on the determined relation between the Visual-Inertial-Odometry coordinate system and the Object Tracking coordinate system and anchored to the physical object.

9. The system of claim 8, wherein at the least some of the frames of the video stream that are processed using object tracking comprises frames in which a model representing the physical object in the scene is found.

10. The system of claim 9, wherein the relation between the Visual-Inertial-Odometry coordinate system and the Object Tracking coordinate system is determined by generating an estimated transform from the Visual-Inertial-Odometry coordinate system and the Object Tracking coordinate system.

11. The system of claim 10, wherein the transform is generated by:

selecting a plurality of scale candidates for each frame for which both a Visual-Inertial-Odometry camera pose and an Object Tracking camera pose have been determined;

generating a plurality of transform candidates, using the scale candidates, for each frame for which both a Visual-Inertial-Odometry camera pose and an Object Tracking camera pose have been determined;

determining a probable transform from among the plurality of transform candidates; and generating the transform based on the determined probable transform.

12. The system of claim 11, wherein the probable transform is determined using a generalized Hough transform.

13. The system of claim 12, further comprising weighting votes in the generalized Hough transform corresponding to more recent frames higher than votes corresponding to less recent frames.

14. The system of claim 13, further comprising determining an orientation of the object by averaging orientations from votes for which a corresponding 4D line was used in the generalized Hough transform to support the transform.

15. A computer program product for presenting augmented reality content, the computer program product comprising a non-transitory computer readable storage having program instructions embodied therewith, the program instructions executable by a computer, to cause the computer to perform a method comprising:

receiving a video stream, comprising a plurality of frames, the video stream generated using a camera that is moving about a scene;

determining a Visual-Inertial-Odometry camera pose for each frame in the video stream in a Visual-Inertial-Odometry coordinate system using visual inertial odometry;

determining an Object Tracking camera pose for at least some of the frames of the video stream in an Object Tracking coordinate system using object tracking;

determining a relation between the Visual-Inertial-Odometry coordinate system and the Object Tracking coordinate system using those frames for which both a Visual-Inertial-Odometry camera pose and an Object Tracking camera pose have been determined; and generating augmented reality content that is placed in the video stream of the scene at a location based on the determined relation between the Visual-Inertial-Odometry coordinate system and the Object Tracking coordinate system.

16. The computer program product of claim 13, wherein at the least some of the frames of the video stream that are processed using object tracking comprises frames in which a model representing an object in the scene is found.

17. The computer program product of claim 14, wherein the relation between the Visual-Inertial-Odometry coordinate system and the Object Tracking coordinate system is determined by generating an estimated transform from the Visual-Inertial-Odometry coordinate system and the Object Tracking coordinate system.

18. The computer program product of claim 15, wherein the transform is generated by:

selecting a plurality of scale candidates for each frame for which both a Visual-Inertial-Odometry camera pose and an Object Tracking camera pose have been determined;

generating a plurality of transform candidates, using the scale candidates, for each frame for which both a Visual-Inertial-Odometry camera pose and an Object Tracking camera pose have been determined;

determining a probable transform from among the plurality of transform candidates; and generating the transform based on the determined probable transform.

19. The computer program product of claim 16, wherein the probable transform is determined using a generalized Hough transform.

20. The computer program product of claim 17, further comprising weighting votes in the generalized Hough transform corresponding to more recent frames higher than votes corresponding to less recent frames, and further comprising determining an orientation of the object by averaging orientations from votes for which a corresponding 4D line was used in the generalized Hough transform to support the transform.

* * * * *